(12) United States Patent
Meyer

(10) Patent No.: US 10,620,229 B2
(45) Date of Patent: Apr. 14, 2020

(54) MAGNETIC FIELD SENSOR SYSTEMS AND METHOD OF DETERMINING OPERABILITY OF SAME

(71) Applicant: NXP B.V., Eindhoven (NL)

(72) Inventor: Robert Meyer, Hamburg (DE)

(73) Assignee: NXP B.V., Eindhoven (NL)

( * ) Notice: Subject to any disclaimer, the term of this patent is extended or adjusted under 35 U.S.C. 154(b) by 340 days.

(21) Appl. No.: 15/686,715

(22) Filed: Aug. 25, 2017

(65) Prior Publication Data
US 2019/0064197 A1 Feb. 28, 2019

(51) Int. Cl.
*G01D 5/16* (2006.01)
*G01P 3/44* (2006.01)
*B60T 8/32* (2006.01)
*B60T 8/1761* (2006.01)
*G01P 21/02* (2006.01)

(52) U.S. Cl.
CPC .............. *G01P 3/44* (2013.01); *B60T 8/1761* (2013.01); *B60T 8/329* (2013.01); *G01P 21/02* (2013.01); *B60T 2270/416* (2013.01)

(58) Field of Classification Search
CPC ............ G01D 5/16; G01D 5/147; G01D 5/20; G01D 5/14; G01D 5/204; G01P 3/44; G01P 21/02; B60T 8/1761; B60T 2270/416
USPC ....... 324/173, 301, 331, 345, 350, 377, 381, 324/389, 463, 205–263, 529, 750.12, 324/750.21, 754.17, 754.29, 167, 174, 324/179
See application file for complete search history.

(56) References Cited

U.S. PATENT DOCUMENTS

| 5,594,173 A | 1/1997 | Frey et al. |
|---|---|---|
| 6,188,948 B1 | 2/2001 | Shivler, Jr. |
| 8,818,740 B2 | 8/2014 | McCoy |
| 8,818,749 B2 | 8/2014 | Friedrich et al. |
| 9,465,683 B2 | 10/2016 | Slama et al. |
| 2008/0053189 A1 | 3/2008 | Bell |

(Continued)

FOREIGN PATENT DOCUMENTS

WO    WO 2016/077066 A1    5/2016

OTHER PUBLICATIONS

U.S. Appl. No. 15/967,840; 46 pages (filed May 1, 2018).
Non Final Office Action; U.S. Appl. No. 15/967,840; 15 pages (dated Sep. 12, 2019).

*Primary Examiner* — Patrick Assouad
*Assistant Examiner* — Taqi R Nasir
(74) *Attorney, Agent, or Firm* — Charlene R. Jacobsen

(57) ABSTRACT

A system includes a magnetic sense element for detecting an external magnetic field and a magnetic field source proximate the magnetic sense element for providing an internal magnetic field that is detectable by the magnetic sense element. The system selectively functions in-situ in either of an operational mode and a standstill mode. The magnetic sense elements detects the external magnetic field in the operational mode. The external magnetic field is not available for detection in the standstill mode, and the internal magnetic field is provided only when the system is in the standstill mode. The system further includes a processing circuit that processes an output signal produced by the magnetic sense element in response to the internal magnetic field to determine operability of the system and to detect failures within the entire signal processing chain.

19 Claims, 6 Drawing Sheets

(56) References Cited

U.S. PATENT DOCUMENTS

| | | | |
|---|---|---|---|
| 2009/0051352 A1* | 2/2009 | Hoskins | B62D 15/021 324/207.2 |
| 2012/0182658 A1* | 7/2012 | Motz | G01P 3/489 361/91.5 |
| 2012/0194181 A1 | 8/2012 | Zhang | |
| 2012/0268074 A1* | 10/2012 | Cooley | H01G 11/58 320/130 |
| 2014/0327435 A1* | 11/2014 | Rohrer | G01R 33/0094 324/251 |
| 2016/0004585 A1 | 1/2016 | Slama et al. | |
| 2016/0139229 A1* | 5/2016 | Petrie | G01R 33/09 324/202 |
| 2016/0313413 A1 | 10/2016 | Mohan et al. | |
| 2016/0320462 A1 | 11/2016 | Mather et al. | |
| 2017/0092024 A1* | 3/2017 | Slama | G07C 5/0816 |
| 2017/0336481 A1 | 11/2017 | Latham et al. | |
| 2018/0011140 A1 | 1/2018 | Chaware et al. | |
| 2018/0023977 A1 | 1/2018 | Park et al. | |

\* cited by examiner

MAGNETIC FIELD SENSOR SYSTEMS AND METHOD OF DETERMINING OPERABILITY OF SAME

TECHNICAL FIELD OF THE INVENTION

The present invention relates generally to magnetic field sensor systems. More specifically, the present invention relates to a magnetic field sensor system, such as a speed sensor, and methodology for determining operability of the speed sensor during a standstill mode for functional safety fault detection.

BACKGROUND OF THE INVENTION

Magnetic field sensor systems are utilized in a variety of commercial, industrial, and automotive applications to measure magnetic fields for purposes of speed and direction sensing, rotation angle sensing, proximity sensing, and the like. In some applications, a magnetic field sensor system may be used as a wheel speed sensor for reading the speed of a vehicle's wheel rotation. Wheel speed sensors may be implemented within an anti-lock braking system (ABS). ABS is an automotive safety system that allows the wheels on a motor vehicle to maintain tractive contact with the road surface according to driver inputs while braking, thus preventing the wheels from locking up (ceasing rotation) and avoiding uncontrolled skidding.

BRIEF DESCRIPTION OF THE DRAWINGS

The accompanying figures in which like reference numerals refer to identical or functionally similar elements throughout the separate views, the figures are not necessarily drawn to scale, and which together with the detailed description below are incorporated in and form part of the specification, serve to further illustrate various embodiments and to explain various principles and advantages all in accordance with the present invention.

DETAILED DESCRIPTION

In overview, the present disclosure concerns magnetic field sensor systems and methodology for testing the operability of such magnetic field sensor systems even if no external excitation magnetic field is available. More particularly, a magnetic field sensor system may be implemented as a wheel speed sensor of an anti-lock braking system (ABS) application. In an ABS application, the wheel speed sensor system typically functions in either of an operational mode and a standby (i.e., a standstill) mode. In the operational mode, a magnetic sense element of the wheel speed sensor detects an external magnetic field indicative of the speed of an object, such as a vehicle. In the standstill mode, the vehicle is not moving and the external magnetic field is not available for detection by the magnetic sense element. A magnetic field source, in proximity to the magnetic sense element of the speed sensor, provides an internal magnetic field only when the system is in the standstill mode. The internal magnetic field, with defined amplitude and timing, can be detected by the magnetic sense element to determine in-situ operability of the speed sensor system. That is, the entire signal path can be monitored during standstill mode to identify device failures during operation and/or to detect sensitivity changes or drifts, excessive noise levels, and the like.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It should be understood that the use of relational terms, if any, such as first and second, top and bottom, and the like are used solely to distinguish one from another entity or action without necessarily requiring or implying any actual such relationship or order between such entities or actions. Furthermore, some of the figures may be illustrated using various shading and/or hatching to distinguish the different elements produced within the various structural layers. These different elements within the structural layers may be produced utilizing current and upcoming microfabrication techniques of depositing, patterning, etching, and so forth. Accordingly, although different shading and/or hatching is utilized in the illustrations, the different elements within the structural layers may be formed out of the same material.

Figure 1:
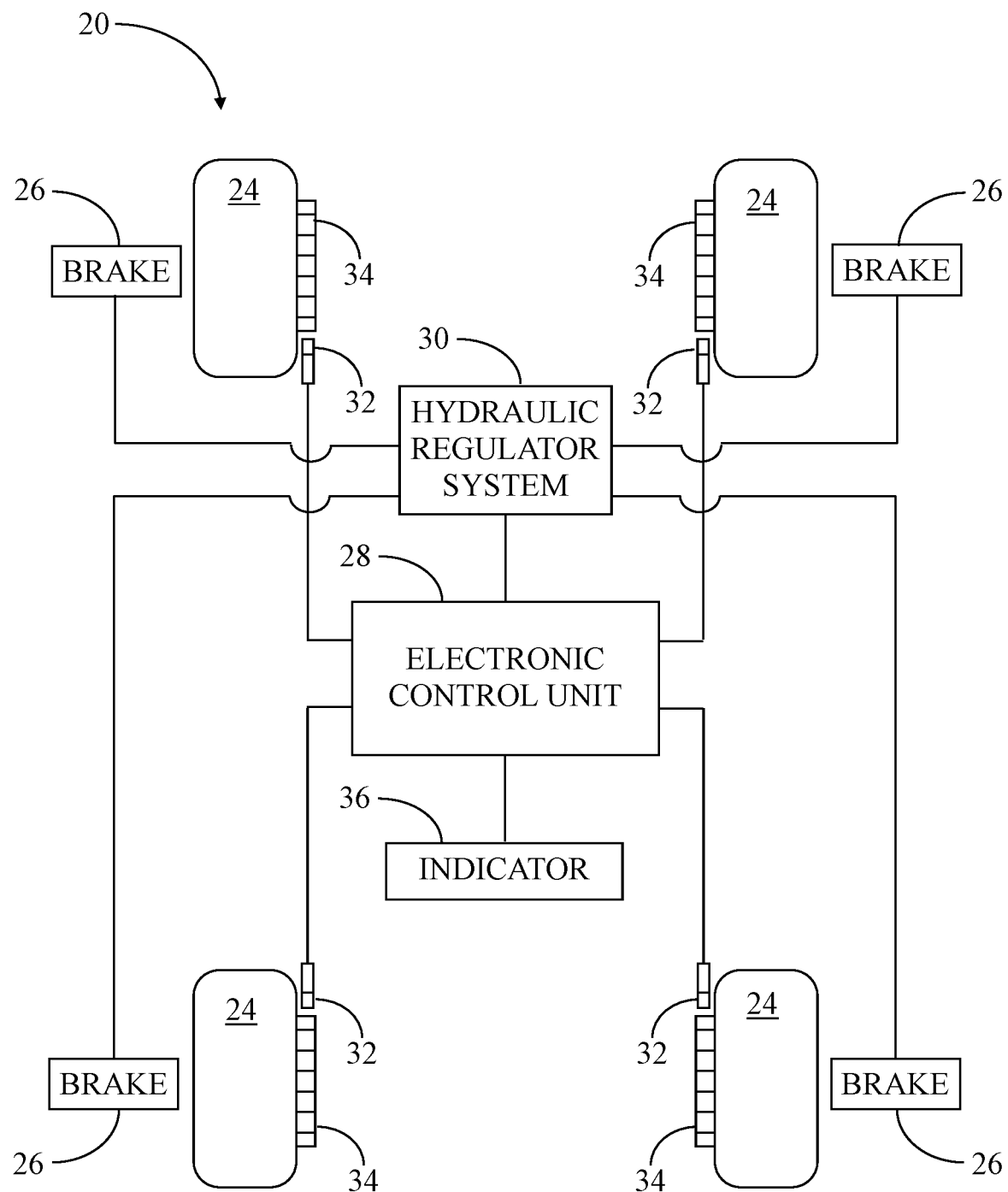
FIG. 1 shows a simplified block diagram of an anti-lock brake system.

Referring to FIG. 1, FIG. 1 shows a simplified block diagram of an anti-lock braking system (ABS) 20 for an object, such as a vehicle 22. As is known to those skilled in the art, a traction control system (TCS) may be provided on an anti-lock braking system. Thus, the term ABS used herein is intended to encompass an anti-lock braking system that may additionally include traction control capabilities. Vehicle 22 is not illustrated in detail herein for simplicity. Instead, vehicle 22 is represented by four wheels 24 and respective brakes 26 coupled thereto. Although four wheels 24 are shown, vehicle 22 may have any number of wheels 24.

In general, ABS 20 includes an ABS electronic control unit 28 communicatively coupled to a hydraulic regulator system 30. Electronic control unit 28 is additionally coupled to a plurality of wheel speed sensors 32. Hydraulic regulator system 30 can include any quantity and configuration of hydraulic valves, hydraulic pumps, hydraulic fluid reservoirs, and the like (not shown for simplicity) that are used to regulate brake actuated pressure supplied to brakes 26. In this example, each of the plurality of wheel speed sensors 32 is coupled to a respective wheel 24 and is configured to sense the rotational speed associated with respective wheel 24. In other configurations, an ABS may use any of a plurality of schemes differentiated by the number of channels (i.e. the quantity of valves that are individually controlled) and the number of speed sensors. These various configurations can include, for example, 1) four-channel, four-sensor ABS, 2) three-channel, four-sensor ABS, 3) three-channel, three-sensor ABS, 4) two-channel, four-sensor ABS, 5) one-channel, one-sensor ABS, and so forth.

Each of wheel speed sensors 32 may include a sensing portion in the form of one or more magnetic field sensors (not shown) that are configured to detect changes or disturbances in a magnetic field that has been created or modified, and from that derive information on the rotational speed of its associated wheel 24. To this end, ABS 20 may include a plurality of rotating encoder wheels 34, each of which is coupled to a respective wheel 24. Encoder wheels 34 are configured to facilitate sensing of the rotational speed of its respective wheel 24 through wheel speed sensors 32. By way of example, an external magnetic field can be detected as alternating magnetic north and south poles (not shown) of encoder wheel 34 passing by its associated wheel speed sensor 32 during rotation of wheel 24. Wheel speed sensor 32 may convert the pole-sequence into a pulsed output voltage, and the rotational speed of encoder wheel 34, and hence wheel 24, may be derived by counting the pulses per second. A bias magnet (not shown) may be used to adjust the sensitivity and measurement range of the magnetic field sensor. Encoder wheels 34 may be implemented as magnetized encoder wheels or encoder wheels 34 may be unmagnetized as in the case of passive encoders, or alternative embodiments may implement a ferromagnetic gear wheel or other similar structure.

Electronic control unit 28 constantly monitors the rotational speed of each wheel 24. If electronic control unit 28 detects one of wheels 24 rotating significantly slower than the other wheels, a condition indicative of impending wheel lock, electronic control unit 28 signals hydraulic regulator system 30 to reduce hydraulic pressure to brake 26 of the affected wheel 24. The reduction of hydraulic pressure reduces the braking force on that wheel 24 so that the wheel 24 rotates faster. Conversely, if the electronic control unit 28 detects one of wheels 24 rotating significantly faster than the other wheels 24, electronic control unit 28 signals hydraulic regulator system 30 to increase the hydraulic pressure to brake 26 of the affected wheel 24. The increase of hydraulic pressure increases the braking force on that wheel 24 so that the wheel 24 rotates slower. This process is repeated continuously such that wheels 24 of vehicle 22 equipped with ABS 20 are unlikely to lock even during panic braking in extreme conditions. If a fault develops in ABS 20, an indicator 36 coupled to electronic control unit 28 may inform the driver of the fault. For example, a warning light may be illuminated on the vehicle instrument panel, and ABS 20 may be disabled until the fault is rectified.

ABS can significantly reduce the potential for loss of traction, skidding, hydroplaning, and so forth under heavy braking conditions. Thus, it is essential to assure that the ABS remains functioning and to address problems with the ABS for maximum safety. Prior art magnetic field sensor systems implemented as speed sensors typically apply a periodic artificial electrical speedpulse signal at the sensor output that signals to a receiving electronic control unit that the application specific integrated circuit (ASIC) associated with the magnetic field sensor is functioning. Unfortunately, since the speedpulse signal is an artificially generated electrical output signal, it cannot be determined whether the magnetic sense element is suitably able to detect a magnetic field that is to be converted into an electrical output signal. Furthermore, in the absence of magnetic field conversion, the correct signal amplification, analog-to-digital conversion, filtering, offset correction, and the like cannot be detected. Thus, fault detection during this operating state is limited to the output stage. Additionally, electrical and magnetic offset drifts (e.g., over temperature) cannot be accurately detected and corrected.

Embodiments described herein enable magnetic field conversion with a magnetic sense element and monitoring of the entire signal processing channel with an ASIC-internally generated magnetic field. As will be described in greater detail below, defects within the signal processing chain can be detected. Therefore, permanent and/or intermittent lifetime failures which may be caused by physical defects occurring during functional operation or during standstill (and therefore cannot be detected by production tests) may be detected. Additionally, the conversion of the magnetic field into a well-defined electrical signal can be used to check for temperature dependent offset drift and for sensor sensitivity calibration. The following pertains to wheel speed sensors used for ABS applications. It should be understood, however, that systems and methodology described herein may be adapted to other speed sensing magnetic field sensor systems that occasionally function in a non-moving standby/standstill mode.

Figure 2:
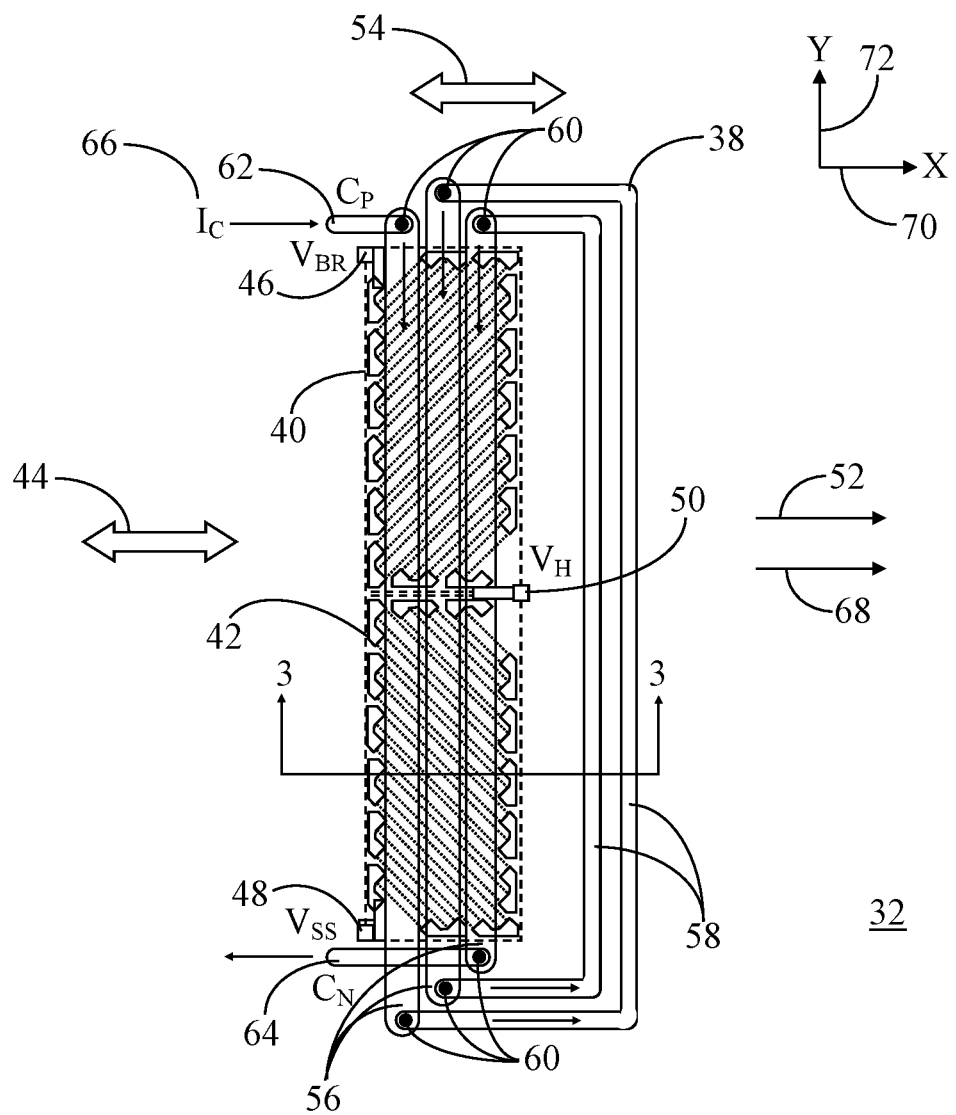
FIG. 2 shows a top view of a sensing portion of a wheel speed sensor of the anti-lock brake system with a magnetic field source in accordance with an embodiment.
Figure 3:
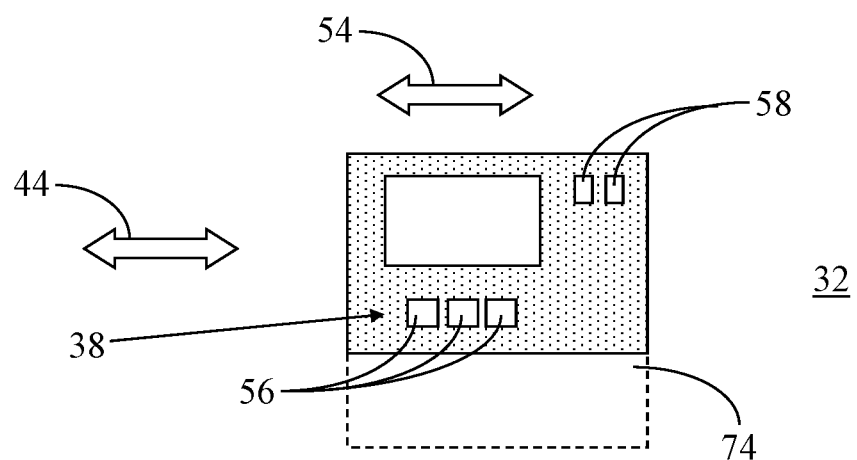
FIG. 3 shows a side sectional view of the sensing portion of the wheel speed sensor and magnetic field source along section lines 3-3 of FIG. 2.

Referring to FIGS. 2-3, FIG. 2 shows a top view of a sensing portion of wheel speed sensor 32 that includes a magnetic field source 38 in accordance with an embodiment and FIG. 3 shows a side sectional view of the sensing portion of wheel speed sensor 32 and magnetic field source 38 along section lines 3-3 of FIG. 2. In this example, speed sensor 32 includes a sensing portion in the form of a first magnetic sense element 40 and a second magnetic sense element 42 (each being delineated by a dashed line box) configured to detect, i.e., sense, an external magnetic field 44 (oriented in a right-left direction on the page). First and second magnetic sense elements 40, 42 may be anisotropic magnetoresistance (AMR) sense elements capable of changing the value of their electrical resistance in response to an externally-applied magnetic field. First magnetic sense element 40 includes nickel-iron (NiFe) stripes that are oriented positive forty-five degrees relative to a direction of external magnetic field 44 and second magnetic sense element 42 includes NiFe stripes that are oriented negative forty-five degrees relative to the direction of external magnetic field 44. The orientation of the NiFe stripes may enable maximum sensitivity of first and second magnetic sense elements 40, 42 to external magnetic field 44. However, other angular orientations are also possible. Although AMR sense elements are mentioned herein. Alternative embodiments may include tunnel magnetoresistance (TMR) sense elements, giant magnetoresistance (GMR) sense elements, Hall effect sense elements, and so forth capable of detecting a magnetic field.

First and second magnetic sense elements 40, 42 may be connected in a half-bridge structure. Connection terminals include a $V_{BR}$ terminal 46, a Vss terminal 48, and a $V_H$ terminal 50. $V_{BR}$ terminal 46 may be connected to a regulated internal voltage supply (discussed below) and Vss terminal 48 may be connected to a system ground. $V_H$ terminal 50 is an output terminal for the half-bridge structure at which a first output signal 52 produced by the half-bridge structure of first and second magnetic sense elements 40, 42 in response to external magnetic field 44 is available for further processing to determine a current speed of vehicle 22.

In accordance with an embodiment, magnetic field source 38 includes an electrically conductive coil structure for providing an internal magnetic field 54 that is generally oriented in the same direction as external magnetic field 44. Thus, magnetic field source 38 may alternatively be referred to herein as a coil structure 38. Coil structure 38 may include conductive, e.g., metallic, traces proximate first and second magnetic sense elements 40, 42. In the illustrated example, coil structure 38 may include a first set of traces 56 that are located directly below first and second magnetic sense elements 40, 42 (see FIG. 3) and a second set of traces 58 that are approximately co-planar with first and second magnetic sense elements 40, 42 and are laterally displaced away from first and second magnetic sense elements 40, 42 (see FIG. 3) to eliminate their influence on the internal magnetic field 54 generated by first set of traces 56. First and second sets of traces 56, 58 are connected with vias 60 at their end points to form coil structure 38.

Connection terminals to coil structure 38 include a $C_P$ terminal 62 and a $C_N$ terminal 64. Coil structure 38 may be arranged such that a coil current 66, represented by arrows overlaying traces 56, 58 flows through coil structure 38 from $C_P$ terminal 62 to $C_N$ terminal 64. Coil current 66 may be switched on and off and/or changed in polarity (discussed below). When coil structure 38 is energized, coil current, $I_C$, 66 flows through coil structure 38 and generates internal magnetic field 54. This internal magnetic field 54 is detectable by first and second magnetic sense elements 40, 42. Thus, a second output signal 68 may be produced by the half-bridge structure of first and second magnetic sense elements 40, 42 in response to internal magnetic field 54. As will be discussed in significantly greater detail below, second output signal 68 is output at $V_H$ terminal 50 and can be processed to determine operability of wheel speed sensor 32.

First and second sense elements 40, 42 are configured to measure external magnetic field 44 in a direction that is parallel to an x-axis 70 of a three-dimensional coordinate system. Accordingly, first and second sets of traces 56, 58 may be oriented approximately perpendicular to the direction of external magnetic field 44, and more particularly, first and second sets of traces 56, 58 are oriented in a lengthwise direction parallel to a y-axis 72 of the three-dimensional coordinate system in order to generate internal magnetic field 54 that is also parallel to x-axis 70.

In the configuration shown in FIGS. 2-3, coil current 66 flows through a total of three traces of first set of traces 56 and through a total of two traces of second set of traces 58 to form three turns of coil structure 38. The first set of traces 56 located directly below first and second sense elements 40, 42 enables good magnetic field coupling to produce second output signal 68 in response to internal magnetic field 54. However, internal magnetic field 54 generated at second set of traces 58 (laterally displaced away from first and second sense elements 40, 42) has little or no influence on second output signal 68.

First and second sense elements 40, 42 and coil structure 38 may be fabricated on an ASIC 74 (shown in dashed line form in FIG. 3) using, for example, top metal layers of ASIC 74. In the example shown, a seven milliampere (mA) coil current 66 may generate internal magnetic field 54 of approximately one hundred ampere/meter (A/m). However, the generated magnetic field strength of internal magnetic field 54 additionally depends on the layer distances, thickness, and area. Alternative embodiments may include more than or less than the three coil turns to obtain the required magnetic field strength of internal magnetic field. Still other embodiments may include a first set of traces directly above the magnetic sense elements and a second set of traces directly below the magnetic sense elements to further increase the magnetic field strength of internal magnetic field.

Wheel speed sensor 32 includes two AMR magnetic sense elements. It should be understood that alternative embodiments may employ tunnel magnetoresistance (TMR) magnetic sense elements, giant magnetoresistance (GMR) sense elements, and the like. Additionally or alternatively, a wheel speed sensor may include more than two magnetic sense elements. For example, a wheel speed sensor may include two or more pairs of vertically stacked magnetic sense elements with coil structure 38 to form a more complex half-bridge structure (for example, to reduce or eliminate field gradients).

Figure 4:
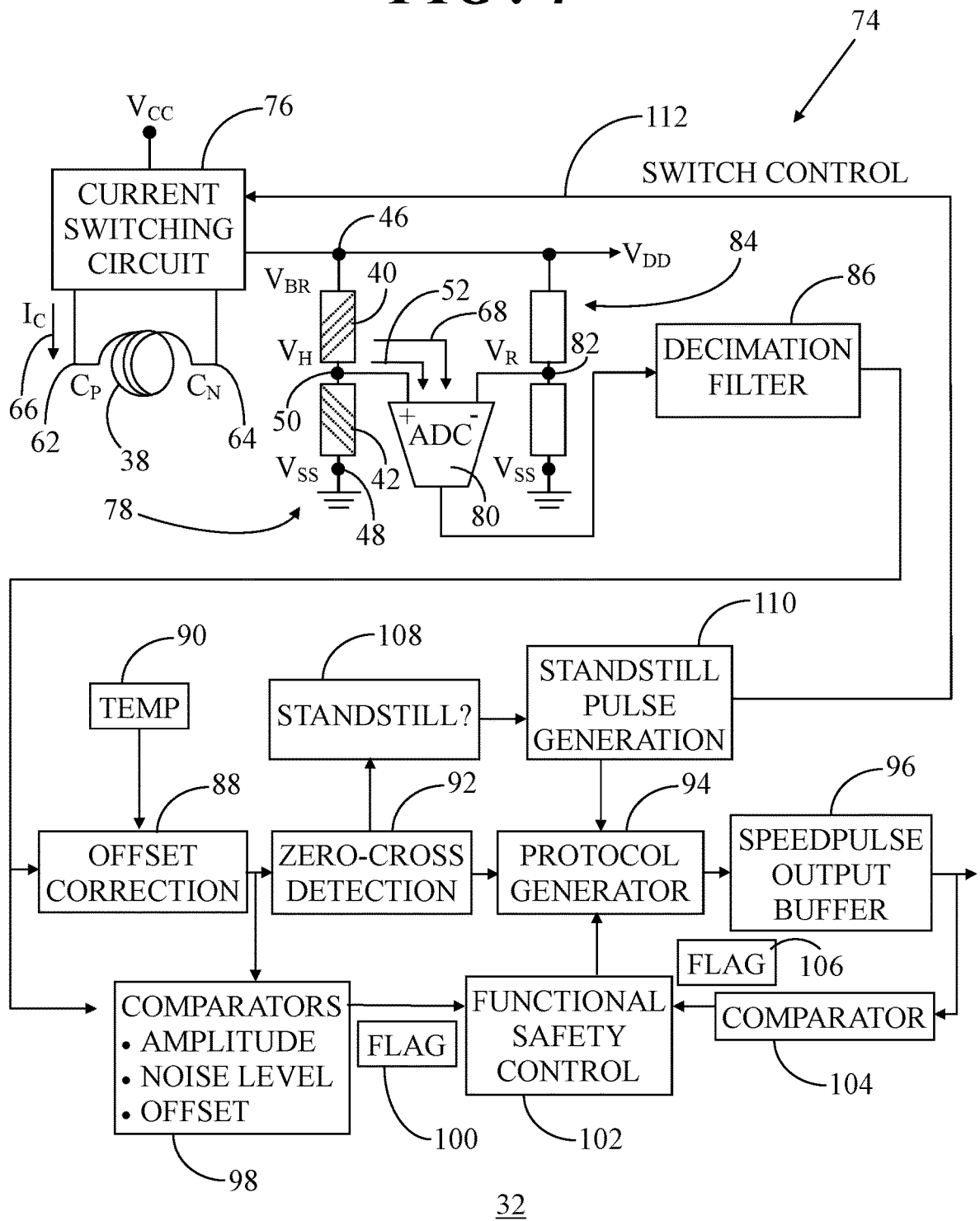
FIG. 4 shows a simplified block diagram of the wheel speed sensor incorporating the magnetic field source for testing operability of the speed sensor system.

Referring now to FIG. 4, FIG. 4 shows a simplified block diagram of one of wheel speed sensors 32 incorporating the magnetic field source 38 (e.g., a coil structure) for testing operability of wheel speed sensor 32. The block diagram of wheel speed sensor 32 is provided to demonstrate a signal flow of either of first and second output signals 52, 68 through a signal processing chain of a processing circuit, and more specifically, ASIC 74.

In general, wheel speed sensor 32 includes a current switching circuit 76 for providing controlled coil current 66 to coil structure 38 near first and second magnetic sense elements 40, 42 to generate internal magnetic field 54 (FIG. 2). Current switching circuit 76 will be described in greater detail in connection with FIG. 5. Wheel speed sensor 32 additionally includes a half-bridge structure 78 of first and second magnetic sense elements 40, 42 formed on ASIC 74, as mentioned above. ASIC 74 may be an integrated circuit that is customized to function with half-bridge structure 78 of first and second magnetic sense elements 40, 42.

In an example configuration, ASIC 74 includes an analog-to-digital converter (ADC) 80 coupled to each of $V_H$ terminal 50 and a $V_R$ terminal 82 of a reference half-bridge structure 84. A magnetic field (e.g., external or internal magnetic fields 44, 54 of FIG. 2) is detected by half-bridge structure 78 of first and second magnetic sense elements 40, 42 and an output signal (e.g., first or second output signals 52, 68) is fed into an input of ADC 80. A decimation filter 86 is coupled to an output of ADC 80. Following analog-to-digital conversion of the output signal and bandwidth limitation (e.g., low-pass filtering) at decimation filter 86, a data word (e.g., sixteen-bit and low-pass filtered) corresponding to the output signal may be output from decimation filter 86. An input of an offset correction block 88 may be coupled to decimation filter 86 for receiving the data word and for applying temperature compensation values 90 for offset correction and amplitude correction.

Offset correction block 88 in turn may be coupled to a zero-cross detection block 92. Zero-cross detection block 92 further analyzes the output signal (e.g., the offset and temperature compensated data word) to generate an output signal that represents the zero-crossings of the magnetic excitation field. These zero-crossings can be detected, for example, as alternating magnetic north and south poles (not shown) of encoder wheel 34 (FIG. 1). Thus, zero-cross detection block 92 can detect when wheel speed sensor 32 is in an operational mode in which vehicle 22 is in motion and external magnetic field 44 (FIG. 2) can be detected. Similarly, zero-cross detection block 92 can detect when wheel speed sensor 32 is in a standstill mode in which the vehicle 22 may be energized, but vehicle 22 is not in motion. The standstill mode can occur following switch ignition and prior to movement of the vehicle 22, when the vehicle 22 is momentarily stopped at a stop sign or stop light, and/or under other conditions in which wheels 24 (FIG. 1) of vehicle 22 are not currently rotating.

Zero-cross detection block 92 is coupled with a protocol generator 94 of a digital core of ASIC 74 which may encode the speed and direction information according to a suitable digital output protocol (e.g., an AK protocol). The encoded speed and direction information is output via protocol generator 94 and further processed in a speedpulse output buffer 96 for communication to electronic control unit 28 (FIG. 1) of ABS 20.

It should be observed that an output of decimation filter 86 may be further coupled to a comparator block 98. Further, an output of offset correction block 88 may be coupled to comparator block 98. At comparator block 98, the data word from decimation filter 86 and output data from the offset correction block 88 may be the received and compared with any other suitable reference values (e.g., amplitude, noise, and/or offset) stored, for example, in memory (not shown). If an expected result of the output signal is not achieved within a defined guard band, an error flag 100 may be risen and communicated to a functional safety control block 102 to signal a sensor measurement fault. Similarly, another comparator block 104 coupled with an output of speedpulse output buffer 96 may receive the encoded speed and direction information. If an expected result of the output signal is not achieved within a defined guard band, an error flag 106 may be risen and communicated to a functional safety control block 102 to signal a sensor measurement or communication fault. Functional safety control block 102 may additionally be in communication with protocol generator 94. Protocol generator 94 may encode the error information according to the digital output protocol for communication to electronic control unit 28. Thus, fault detection of speedpulse output buffer 96 is possible with error flag 106.

It should be further observed that an output of zero-cross detection block 92 may be in communication with a standstill detection block 108. Standstill detection block 108 identifies from information output by zero-cross detection block whether wheel speed sensor 32 is in the operational mode (in which zero-cross detection block 92 detects zero crossings thus indicating that vehicle 22 is in motion) or whether wheel speed sensor 32 is in the standstill mode (in which zero-cross detection block 92 fails to detect zero crossings thus indicating that vehicle 22 is not in motion). Standstill detection block 108 may be coupled with a standstill pulse generation block 110, and standstill pulse generation block 110 may be coupled with current switching circuit 76.

When wheel speed sensor 32 is in the standstill mode as identified at standstill detection block 108, standstill pulse generation block 110 may thus communicate a switch control signal 112 to current switching circuit 76. Switch control signal 112 signals current switching circuit 76 to provide a constant supply current (e.g., coil current 66) through coil structure 38. Alternatively, when wheel speed sensor 32 is in the operational mode as identified at standstill detection block 108, standstill pulse generation block 110 may thus communicate another switch control signal 112 to current switching circuit 76 that signals current switching circuit 76 to not provide coil current 66 through coil structure 38 or to discontinue provision of current 66. In this manner, coil current 66 for generating internal magnetic field 54 is provided only when the wheel speed sensor 32 is in the standstill mode when external magnetic field 44 is not available for detection by magnetic sense elements 40, 42. A well-defined internal magnetic field 54 that is generated only in the standstill mode can be used for sensor calibration and compensation and to determine operability of wheel speed sensor 32 (discussed below).

Figure 5:
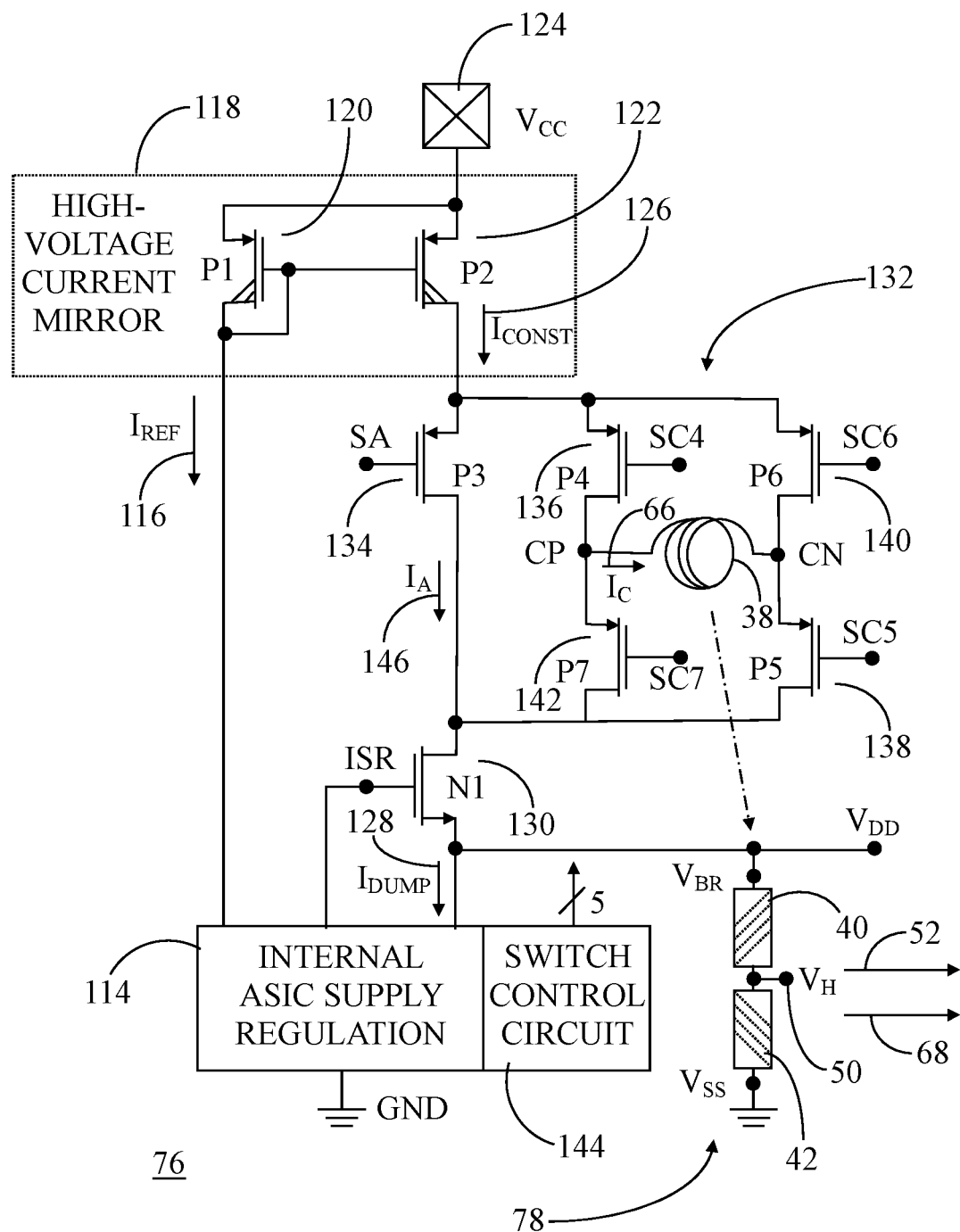
FIG. 5 shows a circuit diagram of a current switching circuit of the speed sensor system of FIG. 4 for providing supply current through the magnetic field source of FIG. 2.

FIG. 5 shows a circuit diagram of current switching circuit 76 of speed sensor system 32 (FIG. 4) for providing supply coil current 66 through coil structure 38 (FIG. 2). An internal ASIC supply regulation block 114 generates a bandgap stable reference current 116, $I_{REF}$. Reference current 116 is fed to a high-voltage current mirror 118. In general, a current mirror is a circuit block which functions to produce a copy of the current in one active device by replicating the current in a second active device. A current mirror has a relatively high output resistance which helps to keep the output current constant, regardless of load conditions. High-voltage current mirror 118 may be built, for example, by high-voltage PMOS (HV-PMOS) transistors 120, 122, labeled P1 and P2 respectively, which decouples current switching circuit 76 from a voltage ($V_{CC}$) supply 124 and generates a constant supply current 126, labeled $I_{CONST}$. Constant supply current 126 can be used to power all active functional circuit components of ASIC 74 (FIG. 4). An $I_{DUMP}$ current 128 is regulated and bypassed directly to ground (GND) to keep supply current 126 constant over the supply voltage, $V_{CC}$, temperature, and alternating load conditions of the internal ASIC circuitry.

In some configurations, an NMOS transistor 130, labeled N1, decouples internal ASIC supply regulation block 114 from a coil switching circuit 132 of current switching circuit 76. Other configurations need not include transistor 130 if the switching noise from coil switching circuit 132 is suitably low.

In an embodiment, coil switching circuit 132 includes five P-type MOS transistor devices (i.e., PMOS transistors) 134, 136, 138, 140, 142 (labeled P3, P4, P5, P6, P7, respectively) configured to switch constant supply current 126 through coil structure 38 or bypass coil structure 38. Transistors 134, 136, 138, 140, 142 are controlled by a switch control circuit 144. If internal magnetic field 54 (FIG. 2) from coil structure 38 is not required (e.g., during operational mode in which external magnetic field 44, FIG. 2, is present), P3 transistor 134 is closed by switching SA to "low" so as to bypass coil switching circuit 132. Additionally, P4, P5, P6, P7 transistors 136, 138, 140, 142 are opened by switching SC4, SC5, SC6, SC7 to "high." In this configuration, a current 146, labeled $I_A$, is equivalent to constant supply current 126.

During the standstill mode for ABS 20 (FIG. 1), an alternating coil current 66, labeled $I_C$, is needed in coil structure 38 to generate internal magnetic field 54 (FIG. 2). When coil current 66 is to be positive (e.g., coil current 66 is equal to constant supply current 126), SC4, and SC5 are switched to "low" to close P4 transistor 136 and P5 transistor 138. SC6 and SC7 are switched to "high" to open P3 transistor 134, P6 transistor 140, and P7 transistor 142. Conversely, when coil current 66 is to be negative (e.g., coil current 66 is equal to negative constant supply current 126), SC6 and SC7 are switched to "low" to close P6 transistor 140 and P7 transistor 142. SA, SC4, and SC5 are switched to "high" to open P3 transistor 134, P4 transistor 136, and P5 transistor 138. To avoid current spikes during switching of the polarity of coil current 66, P3 transistor 134 may be closed briefly by switching SA to "low." This can also be used to smooth the edges for harmonics reduction. Still further, the constant supply current 66 through coil structure 38 may be faded on and off to avoid signal distortion.

Half-bridge structure 78 of first and second magnetic sense elements 40, 42 is also shown in FIG. 5. The output signal (e.g., second output signal 68) may be compared with a reference half-bridge signal output reference half-bridge structure 84 (FIG. 4) and fed to the signal processing channel that can include analog-to-digital conversion, decimation filtering, offset correction, and zero-cross detection, as discussed in connection with FIG. 4.

Accordingly, in a functional mode (e.g., either of operational or standstill modes) and through switch control provided via current switching circuit 76, the active ASIC 74 consumes a constant current 126 that is controlled by P1 and P2 transistors 120, 122. This constant current 126, as coil current 66, will additionally be used to supply coil structure 38. The voltage drop via coil structure 38 and the switches (i.e., transistors 134, 136, 138, 140, 142) should be kept low (for example, less than 200 mV). Therefore, wide metal lines for the first and second sets of traces 56, 58 (FIG. 2) and minimal coil turns may be beneficial. The ASIC current may be kept constant within ASIC 74 by another regulation loop (not shown).

Figure 6:
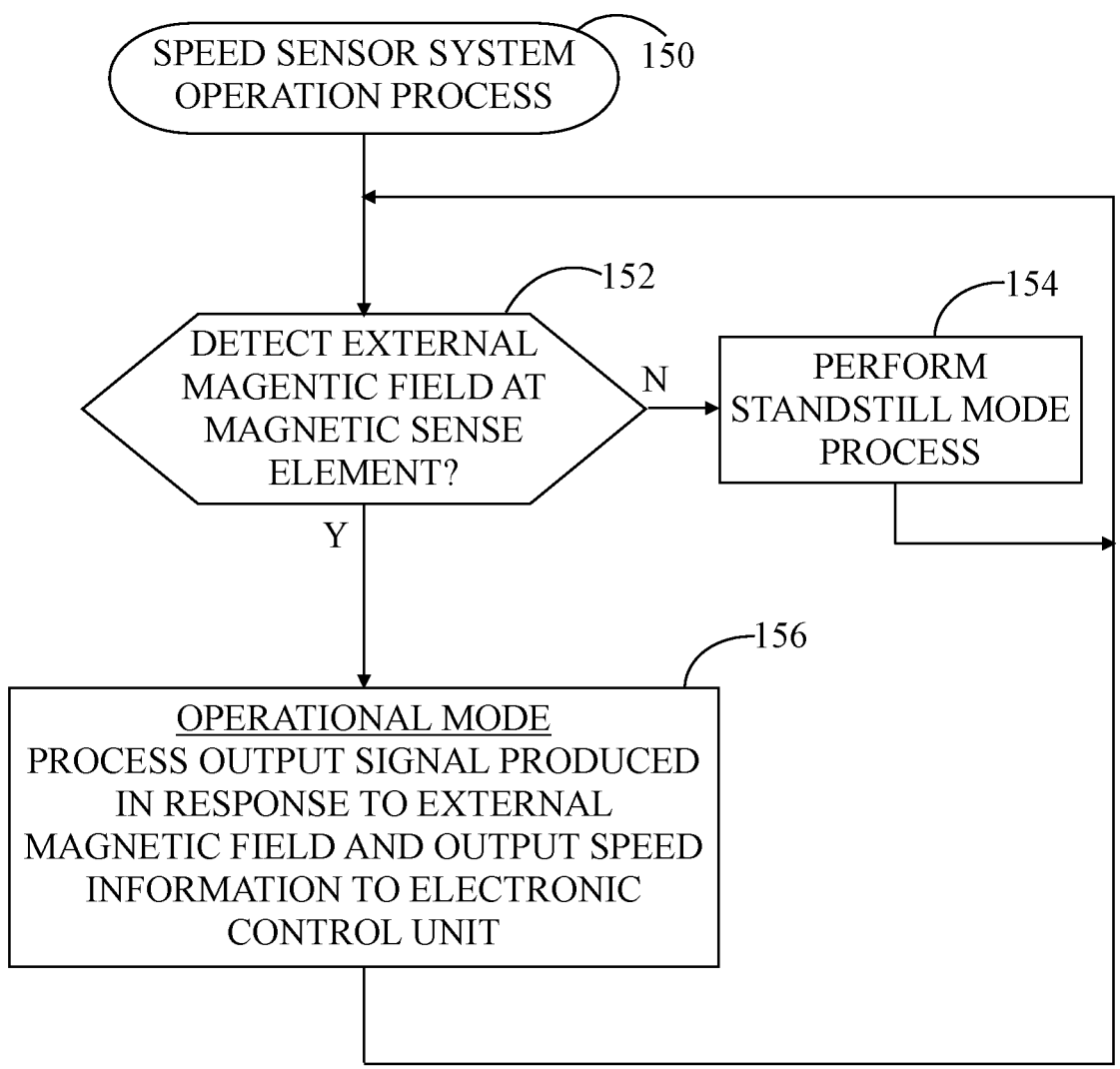
FIG. 6 shows a flowchart of a speed sensor operation process.

Now referring to FIG. 6 FIG. 6 shows a flowchart of a speed sensor operation process 150 in accordance with an embodiment. Speed sensor operation process 150 is performed "in-situ." That is, process 150 is executed when wheel speed sensor 32 is incorporated in an end use application, such as ABS 20, and is capable of functioning in the end use application in either of an operational mode and a standstill mode. Thus, speed sensor operation process 150 may be automatically executed when vehicle 22 (FIG. 1), and thus ABS 20 with wheel speed sensor 32 is energized, i.e., when the ignition of vehicle 22 is turned on. Process 150 is described in connection with the functions of wheel speed sensor 32 (FIG. 4). Accordingly, reference may be made concurrently to the simplified block diagram of FIG. 4. Although speed sensor operation process 150 is described in connection with one of wheel speed sensors 32, it should be understood that speed sensor operation process 150 may be executed concurrently at each of wheel speed sensors 32 of ABS 20 (FIG. 1).

At a query block 152, a determination is made as to whether wheel speed sensor 32 currently detects external magnetic field 44 (FIG. 2). When wheel speed sensor 32 does not detect external magnetic field 44 (e.g., an absence of zero crossings at zero-cross detection block 92) within a given timeframe (e.g., 150 milliseconds) at magnetic sense elements 40, 42 of half-bridge structure 78, process 150 continues to a block 154. At block 154, a standstill mode process is performed. Thereafter, and as long as the vehicle is energized, process control remains active as denoted by returning to query block 152 to monitor for external magnetic field 44. The standstill mode process will be described below in connection with FIG. 7. When a determination is made at query block 152 that external magnetic field 44 is detected at magnetic sense elements 40, 42 of half-bridge structure 78, process 150 continues to a block 156.

At block 156, wheel speed sensor 32 enters the operational mode in which first output signal 52 is produced in response to external magnetic field 44 and suitably processed via ADC 80, decimation filter 86, offset correction 88, zero-cross detection 92, protocol generator 94, and speedpulse output buffer 96 in accordance with conventional operation so as to output information such as wheel speed and direction to electronic control unit 28 (FIG. 1). Thereafter, and as long as the vehicle is energized, process control remains active by returning to query block 152 to monitor for external magnetic field 44. Thus, speed sensor operation process 150 describes an in-situ process in which the current speed of an associated wheel 24 is continuously detected, processed, and communicated to electronic control unit 28 when wheel 24 is rotating. Occasionally, however, when external magnetic field 44 is not detected (and therefore wheel 24 is not rotating), the standstill mode process will be performed.

Figure 7:
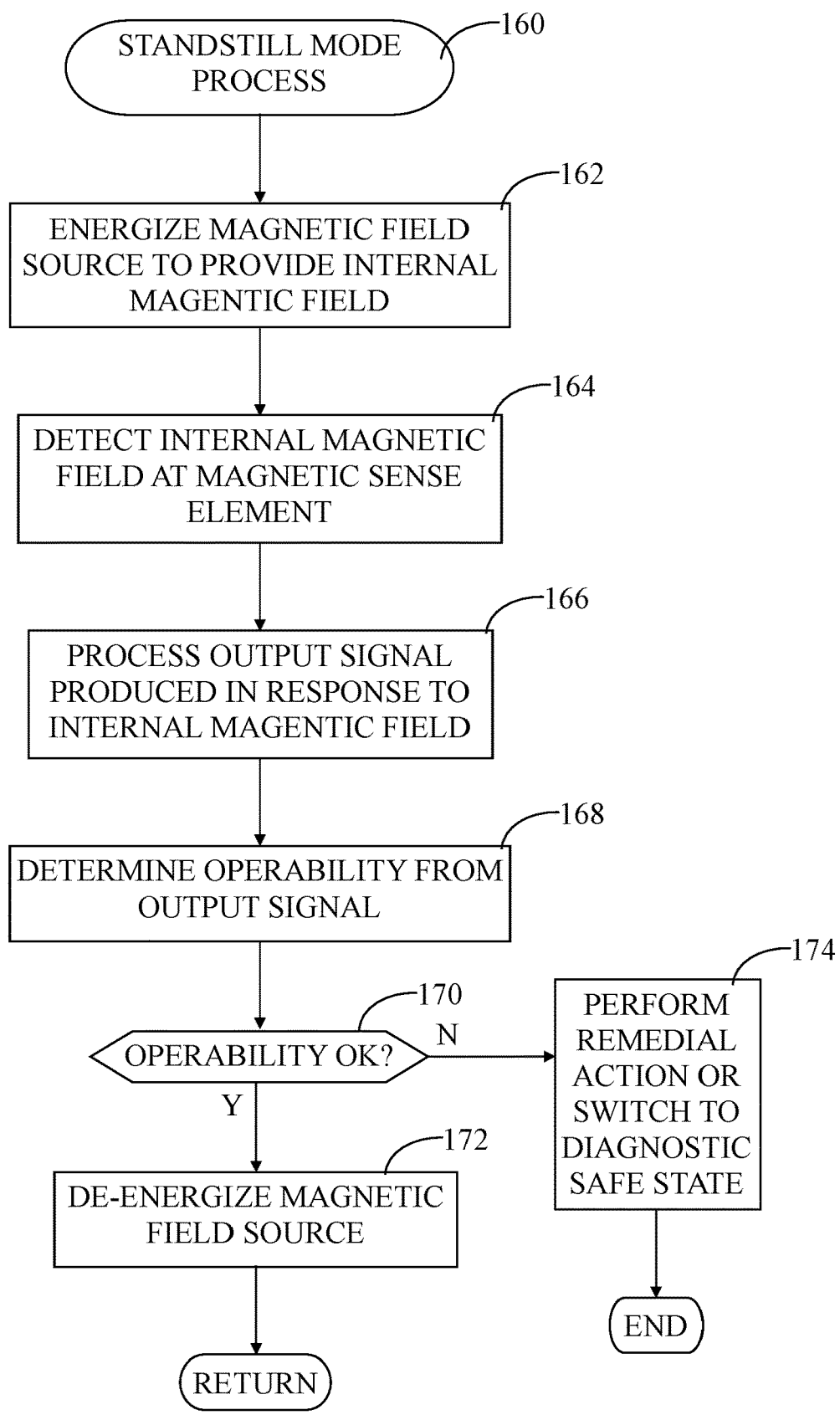
FIG. 7 shows a flowchart of a standstill mode process performed in connection with the speed sensor operation process of FIG. 6.

FIG. 7 shows a flowchart of a standstill mode process 160 performed in connection with the speed sensor operation process 150 (FIG. 6) in accordance with an embodiment. It bears repeating that standstill mode process 160 is performed in the absence of external magnetic field 44, thereby indicating that vehicle 20 is immobile. Thus, external magnetic field 44 is not available for detection by magnetic sense elements 40, 42 of half-bridge structure 78 in the standstill mode.

At a block 162 of standstill mode process 160, the magnetic field source (e.g., coil structure 38) is energized to provide a well-defined internal magnetic field 54. For example, standstill mode block 108 identifies from information output by zero-cross detection block 92 that wheel speed sensor 32 is in the standstill mode after a given timeframe (e.g., 150 milliseconds) in which zero-cross detection block 92 fails to detect zero crossings thus indicating that vehicle 22 is not in motion. Positive identification of the standstill mode causes standstill pulse generation block 110 to signal current switching circuit 76 to provide coil current 66 through coil structure 38.

At a block 164, internal magnetic field 54 may be detected by magnetic sense elements 40, 42 of half-bridge structure 78, and half-bridge structure 78 produces second output signal 68 in response to internal magnetic field 54. At a block 166, second output signal 68 is suitably processed by the processing circuit (ASIC 74) via ADC 80, decimation filter 86, offset correction block 88, zero cross detection block 92, and so forth. A block 168 is performed to determine operability of wheel speed sensor 32 by sending the standstill protocol via protocol generator 94 and speedpulse output buffer 96 to the output for communication to, for example, electronic control unit 28 (FIG. 1).

At a query block 170 performed in connection with block 168, an assessment is made whether speed sensor operability is satisfactory. When speed sensor operability is satisfactory, a block 172 may be executed to de-energize coil structure 38. Thereafter, and as long as the vehicle is energized, process control remains active by returning to query block 152 (FIG. 6) to monitor for external magnetic field 44. Alternatively, standstill mode process 160 may be continuously repeated within a given timeframe (e.g., 150 milliseconds) until external magnetic field 44 is detected, at which time coil structure 38 will be de-energized.

However, at query block 170, when speed sensor operability is deemed unsatisfactory, process 160 continues with a block 174. At block 174, remedial action is performed to improve the operability of wheel speed sensor 32 and/or wheel speed sensor 32 flags electronic control unit 28 (FIG. 1) to switch ABS 20 into a diagnostic safe state if the signal path is not working correctly. Thus, fault detection for functional safety during the lifetime of wheel speed sensor 32 is possible during the standstill mode and faults can be signaled within an output protocol generated by the protocol generator or by switching the circuit into a diagnostic safe state.

The methodology implementing coil structure 38 can enable detection of a well-defined switching excitation field, e.g., internal magnetic field 54. Magnetic field conversion and sensor sensitivity can be measured because internal magnetic field 54 has a defined value and timing, dependent only on the current flowing through coil structure 38. Accordingly, internal magnetic field 54 can be used as reference for calibration and for monitoring the sensor sensitivity over external conditions (e.g., supply voltage or temperature over lifetime).

The amplitude in least significant bits (LSB) of the data word representative of internal magnetic field 54 may be measured behind decimation filter 86 (FIG. 4). With this amplitude measurement, a determination can be made as to whether a bias magnet associated with first and second magnetic sense elements 40, 42 is still attached or may have lost its magnetization. Further the performance of the analog-to-digital conversion together with decimation can be checked by comparing the measured amplitude as compared with an expected signal amplitude. Thus, sensor sensitivity may be calculated and correction factors may be applied. Still further, supply voltage and temperature dependency may be calculated and calibrated in-situ, correction factors may be applied, and a very fast recovery of the zero crossing after ABS standstill may be possible.

The methodology implementing coil structure 38 can further enable the measurement of noise level at the output of the decimation filter. The measured noise may be compared with a theoretical expected noise level generated by the internal signal processing of ASIC 74 (e.g., due to thermal noise). If the measured noise level exceeds the expected guard band an error flag 100 may be risen. This excessive noise level may indicate an external disturbing magnetic field or a broken component within the ASIC signal processing chain.

The methodology implementing coil structure 38 can further enable comparison of the ASIC-internally generated magnetic excitation field (i.e., internal magnetic field 54) with a theoretically expected signal through a digital level and timing check within a controllable tolerance range on signal amplitude and frequency. If the tolerance range is exceeded, and error flag 100 can be set or the device may switch into the diagnostic safe state.

Consequently, the result produced in response to internal magnetic field 54 may be used in subsequent fault signal processing in order to indicate device failures (for example, wrong field conversion or incorrect sensitivity due to missing or partly destroyed bias magnet), high noise level, incorrect analog-to-digital conversion and filtering, and/or wrong zero-crossing detection. These faults may be indicated by an error protocol during ABS standstill or by a diagnostic safe state of the ASIC within the specified fault tolerance time.

Embodiments described herein entail magnetic field sensor systems and methodology for testing the operability of such magnetic field sensor systems. An embodiment of system comprises a magnetic sense element for detecting an external magnetic field and a magnetic field source proximate the magnetic sense element for providing an internal magnetic field that is detectable by the magnetic sense element, wherein the system selectively functions in-situ in either of an operational mode and a standby mode, and wherein the magnetic sense element detects the external magnetic field in the operational mode, the external magnetic field is not available for detection by the magnetic sense element in the standby mode, and the internal magnetic field is provided only when the system is in the standby mode.

In a speed sensor system capable of functioning in-situ in either of an operational mode and a standstill mode, an embodiment of a method comprises detecting an external magnetic field at a magnetic sense element of the speed sensor system in the operational mode, the external magnetic field indicating movement of an object and processing, at a processing circuit, a first output signal produced by the speed sensor system in response to the external magnetic field to determine a current speed of the object. The method further comprises occasionally determining an absence of the external magnetic field at the magnetic sense element in the standstill mode, the absence of the external magnetic field indicating that the object is immobile, wherein the external magnetic field is not available for detection by the magnetic sense element in the standstill mode, energizing a magnetic field source proximate the magnetic sense element when the speed sensor system is in the standstill mode, the magnetic field source providing an internal magnetic field that is detectable by the magnetic sense element, wherein the internal magnetic field is provided only when the speed sensor system is in the standstill mode, and processing, at the processing circuit, a second output signal produced by the speed sensor system in response to the internal magnetic field to determine operability of the speed sensor system.

An embodiment of speed sensor system comprises a magnetic sense element for detecting an external magnetic field and a magnetic field source proximate the magnetic sense element for providing an internal magnetic field that is detectable by the magnetic sense element, wherein the speed sensor system selectively functions in-situ in either of an operational mode in which an object is moving and a standstill mode in which the object is immobile, and wherein the magnetic sense element detects the external magnetic field in the operational mode, the external magnetic field is not available for detection by the magnetic sense element in the standstill mode, and the internal magnetic field is provided only when the speed sensor system is in the standstill mode. The speed sensor system further comprises a processing circuit in communication with the magnetic sense element for processing either of a first output signal produced in response to the external magnetic field and a second output signal produced in response to the internal magnetic field, and a power supply selectively coupled with the magnetic field source and configured to provide a constant supply current through the magnetic field source for generating the internal magnetic field, the constant supply current being provided only when the speed sensor system is in the standstill mode.

The magnetic field sensor system may be implemented as a wheel speed sensor of an anti-lock braking system (ABS) application in which the wheel speed sensor system typically functions in either of an operational mode and a standby (i.e., a standstill) mode. A magnetic field source, in proximity to the magnetic sense element of the speed sensor, provides an internal magnetic field only when the system is in the standstill mode. The internal magnetic field, with defined amplitude and timing, can be detected by the magnetic sense element to determine in-situ operability of the speed sensor system. Thus, the entire signal path can be monitored during the standstill mode to identify device failures during operation and/or to detect sensitivity changes or drifts, excessive noise levels, and the like. Accordingly, the processes and systems, discussed above, and the inventive principles thereof are intended to enable fault detection and reduction for improved functional safety over the system's lifetime.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A system comprising:
a magnetic sense element for detecting an external magnetic field;
a magnetic field source proximate the magnetic sense element for providing an internal magnetic field that is detectable by the magnetic sense element, wherein the system selectively functions in-situ in either of an operational mode and a standby mode, and wherein the magnetic sense element detects the external magnetic field in the operational mode, the external magnetic field is not available for detection by the magnetic sense element in the standby mode, and the internal magnetic field is provided only when the system is in the standby mode; and
a power supply coupled with the magnetic field source and configured to provide a constant supply current through the magnetic field source for generating the internal magnetic field, the constant supply current being provided only when the system is in the standby mode.

2. The system of claim 1 wherein the magnetic field source comprises an electrically conductive coil structure.

3. The system of claim 1 wherein:
the power supply is selectively coupled with the magnetic field source in a first configuration to cause the constant supply current to flow through the magnetic field source in a first direction to generate the internal magnetic field as a positive magnetic field; and
the power supply is selectively coupled with the magnetic field source in a second configuration to cause the constant supply current to flow through the magnetic field source in a second direction that is opposite the first direction to generate the internal magnetic field as a negative magnetic field.

4. The system of claim 1 wherein the system further comprises a processing circuit in communication with the magnetic sense element for processing either of a first output signal produced in response to the external magnetic field and a second output signal produced in response to the internal magnetic field.

5. The system of claim 4 wherein the power supply is selectively coupled with the processing circuit and the magnetic field surface, and the power supply is further configured to provide the constant supply current to the processing circuit when the system is in the operational mode.

6. The system of claim 5 wherein the constant supply current is concurrently provided to the processing circuit and the magnetic field source when the system is in the standby mode.

7. The system of claim 4 wherein the processing circuit processes the second output signal produced in response to the internal magnetic field to determine operability of the system.

8. The system of claim 1 wherein the magnetic sense element and the magnetic field source are implemented within a speed sensor, and the standby mode is a standstill mode of the speed sensor in which the speed sensor detects that an object is immobile in response to an absence of the external magnetic field.

9. The system of claim 8 wherein the speed sensor is implemented in an anti-lock braking system (ABS) and the object comprises a vehicle.

10. In a speed sensor system capable of functioning in-situ in either of an operational mode and a standstill mode, a method comprising:
detecting an external magnetic field at a magnetic sense element of the speed sensor system in the operational mode, the external magnetic field indicating movement of an object;
processing, at a processing circuit, a first output signal produced by the speed sensor system in response to the external magnetic field to determine a current speed of the object;
occasionally determining an absence of the external magnetic field at the magnetic sense element in the standstill mode, the absence of the external magnetic field indicating that the object is immobile, wherein the external magnetic field is not available for detection by the magnetic sense element in the standstill mode;
energizing a magnetic field source proximate the magnetic sense element when the speed sensor system is in the standstill mode, the magnetic field source providing an internal magnetic field that is detectable by the magnetic sense element, wherein the internal magnetic field is provided only when the speed sensor system is in the standstill mode, wherein the energizing operation comprises coupling a power supply with the magnetic field source to provide a constant supply current through the magnetic field source for generating the internal magnetic field, the constant supply current being provided only when the speed sensor system is in the standstill mode; and
processing, at the processing circuit, a second output signal produced by the speed sensor system in response to the internal magnetic field to determine operability of the speed sensor system.

11. The method of claim 10 wherein:
the method further comprises coupling the power supply with the processing circuit to provide the constant supply current to the processing circuit when the speed sensor system is in either of the operational mode and the standstill mode.

12. The method of claim 11 wherein the energizing operation comprises concurrently providing the constant supply current to the processing circuit and to the magnetic field source when the speed sensor system is in the standstill mode.

13. The method of claim 10 wherein the processing operation comprises comparing the second output signal with at least one reference level to determine operability of the speed sensor system.

14. The method of claim 10 further comprising:
following the energizing operation, detecting the external magnetic field at a magnetic sense element of the speed sensor system, the external magnetic field indicating movement of an object and a return to the operational mode; and
de-energizing the magnetic field source in response to detection of the external magnetic field.

15. The method of claim 10 further comprising:
in response to processing the second output signal, identifying a fault condition of the speed sensor system; and
communicating from the processing circuit the fault condition of the speed sensor system.

16. The method of claim 10 further comprising:
in response to processing the second output signal, determining an offset and amplitude correction requirement; and
applying an offset and amplitude correction factor to the speed sensor system.

17. A speed sensor system comprising:
a magnetic sense element for detecting an external magnetic field;
a magnetic field source proximate the magnetic sense element for providing an internal magnetic field that is detectable by the magnetic sense element, wherein the speed sensor system selectively functions in-situ in either of an operational mode in which an object is moving and a standstill mode in which the object is immobile, and wherein the magnetic sense element detects the external magnetic field in the operational mode, the external magnetic field is not available for detection by the magnetic sense element in the standstill mode, and the internal magnetic field is provided only when the speed sensor system is in the standstill mode;
a processing circuit in communication with the magnetic sense element for processing either of a first output signal produced in response to the external magnetic field and a second output signal produced in response to the internal magnetic field; and
a power supply selectively coupled with the magnetic field source and configured to provide a constant supply current through the magnetic field source for generating the internal magnetic field, the constant supply current being provided only when the speed sensor system is in the standstill mode.

18. The speed sensor system of claim 17 wherein the power supply is further selectively coupled with the processing circuit to provide the constant supply current to the processing circuit when the system is in either of the operational mode and the standstill mode.

19. The speed sensor system of claim 17 wherein the speed sensor system is an anti-lock braking system (ABS) and the object comprises a vehicle.

* * * * *